(12) United States Patent
Charlton

(10) Patent No.: US 6,434,942 B1
(45) Date of Patent: Aug. 20, 2002

(54) BUILDING, OR OTHER SELF-SUPPORTING STRUCTURE, INCORPORATING MULTI-STAGE SYSTEM FOR ENERGY GENERATION

(76) Inventor: Walter T. Charlton, 230 Kirkley Rd., Annapolis, MD (US) 21401-1102

( * ) Notice: Subject to any disclaimer, the term of this patent is extended or adjusted under 35 U.S.C. 154(b) by 0 days.

(21) Appl. No.: 09/955,946

(22) Filed: Sep. 20, 2001

(51) Int. Cl.[7] .............................. F03G 6/00; F01K 7/00
(52) U.S. Cl. ................................ 60/641.11; 60/641.15; 60/675
(58) Field of Search .................. 60/641.8, 641.11, 60/641.15, 675

(56) References Cited

U.S. PATENT DOCUMENTS

| | | |
|---|---|---|
| 641,214 A | 1/1900 | Matthias |
| 3,953,971 A | 5/1976 | Parker |
| 3,983,704 A | 10/1976 | McFarland |
| 4,002,031 A | 1/1977 | Bell |
| 4,010,614 A | 3/1977 | Arthur |
| 4,095,429 A | 6/1978 | Morey |
| 4,103,493 A * | 8/1978 | Schoenfelder ........... 60/641.11 |
| 4,149,903 A | 4/1979 | Lindmayer |
| 4,191,164 A | 3/1980 | Kelly |
| 4,200,783 A * | 4/1980 | Ehret .................. 60/641.11 X |
| 4,244,189 A | 1/1981 | Bliamptis |
| 4,249,516 A | 2/1981 | Stark |
| 4,255,933 A * | 3/1981 | Bailey et al. ............. 60/675 X |
| 4,280,328 A | 7/1981 | Falconer |
| 4,306,416 A | 12/1981 | Iozzi |
| 4,326,012 A | 4/1982 | Charlton |
| 4,382,365 A * | 5/1983 | Kira et al. ..................... 60/675 |
| 4,391,100 A | 7/1983 | Smith |
| 4,401,103 A | 8/1983 | Thompson |
| 4,910,963 A | 3/1990 | Vanzo |
| 5,518,554 A | 5/1996 | Newman |
| 6,062,029 A | 5/2000 | Doe |
| 6,080,927 A | 6/2000 | Johnson |

* cited by examiner

Primary Examiner—Hoang Nguyen
(74) Attorney, Agent, or Firm—Nath & Associates PLLC; Harold L. Novick

(57) ABSTRACT

A building, or other self-supporting structure, incorporating a multi-stage system for energy generation, is disclosed. The system comprises several elements connected together to form a loop within the self-supporting structure. A moving fluid circulates within the loop. Part of the loop is comprised of a series of connected solar building blocks incorporated into the walls of the structure. The building blocks concentrate and collect solar radiation, to directly produce electricity by means of embedded photovoltaic cells, and to heat a moving fluid which carries thermal energy away from the solar cells and vertically up to a gas turbine connected to an electrical generator. The returning fluid, is condensed to a liquid and directed downwardly to a liquid turbine connected to an electrical generator. A return pipe closes the loop by returning the fluid to the bottom of the series of building blocks.

10 Claims, 2 Drawing Sheets

BUILDING, OR OTHER SELF-SUPPORTING STRUCTURE, INCORPORATING MULTI-STAGE SYSTEM FOR ENERGY GENERATION

FIELD OF THE INVENTION

This invention relates to static structures, such as a building, which incorporate a system for producing electricity, and more particularly to a static structure incorporating a system that produces electricity by using solar radiation and different kinds of energy transformation for maximum efficiency.

BACKGROUND OF THE INVENTION

The recent energy crisis, as illustrated by skyrocketing fuel prices and electric power outages in the state of California, has brought back the idea that there is a need to develop alternate sources of energy. One available source of energy is the Sun, providing electromagnetic radiation in the form of heat radiation and light radiation. Another source of energy is the gravitational field of the Earth, in the form of kinetic energy of falling water, for instance. Power generating devices have been developed in the past to take advantage of one or the other source of energy, or both in combination.

The two sources of energy can be combined to increase efficiency. Another way to increase efficiency is to concentrate the solar radiation, using reflectors and/or lenses. The high frequency part of the spectrum in solar radiation can be used to directly produce electricity by means of photovoltaic cells. The heat produced by the low frequency end of the spectrum can be used to heat or evaporate a fluid and bring it to a higher elevation. The fluid can then acquire kinetic energy by falling back to a lower level, and power a hydraulic turbine/electric generator assembly. The thermal energy carried by the heated fluid can also provide electricity by powering a heat turbine/electric generator assembly.

Several combinations of the above elements have been disclosed in the past.

Smith (U.S. Pat. No. 4,391,100) and Arthur (U.S. Pat. No. 4,010,614) disclose systems for converting solar radiation into electricity that include a concentrator and a boiler for producing steam. The steam moves upward and is used to drive a primary steam-powered turbine coupled to an electric generator. The steam is then condensed and the produced water falls down to a secondary water-powered turbine coupled to an electric generator. The water then goes back to its initial location in the boiler and is ready for a new cycle.

The present inventor (U.S. Pat. No. 4,326,012) discloses a building block, to be used in static structures such as walls and for converting solar radiation into electricity that include a concentrator and photovoltaic cells. The excess heat concentrated at the photovoltaic cells is extracted by means of a circulating fluid that carries the thermal energy away.

Johnson (U.S. Pat. No. 6,080,927), Newman (U.S. Pat. No. 5,518,554), Stark (U.S. Pat. No. 4,249,516), Kelly (U.S. Pat. No. 4,191,164) and Bell (U.S. Pat. No. 4,002,031) disclose systems for converting solar radiation into electricity that include a concentrator and photovoltaic cells. In each case, the excess heat concentrated at the photovoltaic cells is extracted by means of a circulating fluid that carries the thermal energy away to a secondary system where it can be used to drive a steam-powered turbine coupled to an electric generator.

Doe (U.S. Pat. No. 6,062,029) and Thompson (U.S. Pat. No. 4,401,103) disclose systems for concentrating solar radiation, and using the produced heat to evaporate a moving fluid. This fluid is then used to drive a steam-powered turbine coupled to an electric generator.

Vanzo (U.S. Pat. No. 4,910,963) and Lindmayer (U.S. Pat. No. 4,149,903) disclose systems for directly converting solar radiation into electric current by means of photovoltaic cells. In a second phase, thermal energy is converted into electric energy by means of a steam-powered turbine coupled to an electric generator.

Falconer (U.S. Pat. No. 4,280,328), Bliamptis (U.S. Pat. No. 4,244,189), McFarland (U.S. Pat. No. 3,983,704) and Parker (U.S. Pat. No. 3,953,971) disclose systems for converting solar radiation into electricity in a two-phase process. In a first stage, solar radiation is used to evaporate a fluid that moves up to a primary steam-powered turbine or engine coupled to an electric generator. In a second stage, the fluid is condensed and falls back to a lower height. Its gravitational potential energy is converted into kinetic energy that is used to drive a liquid-powered turbine or engine coupled to an electric generator.

Iozzi (U.S. Pat. No. 4,306,416) and Morey (U.S. Pat. No. 4,095,429) disclose systems in which heat (from solar radiation or any other source) is used to evaporate a fluid and make it move upward to a higher position where it gets gravitational potential energy. The fluid is then condensed and driven downward in order to convert its potential energy into kinetic energy that can be used to activate a hydraulic turbine and thus, produce electricity.

Each of the foregoing U.S. patents is incorporated herein in its entirety by reference.

All of these systems fall short of thoroughly taking advantage of the possibilities offered by the combination of solar and gravitational energy. Their low efficiency and high cost of manufacture and installation have been an obstacle to their wider application.

SUMMARY OF THE INVENTION

The present invention overcomes the aforesaid problems and deficiencies of the prior art by an integrated building system in which several components which use solar energy are combined into a system utilizing a plurality of solar building blocks incorporated into a static structure such as a wall.

An advantage of the present invention is to provide an autonomous system for producing electricity, by which a building can produce its own energy and not depend entirely on an electric company for its power supply.

Another advantage of the present invention is its efficiency. By collecting the unused energy in one element of the system to power the next element of the system, the waste of energy is minimized.

A still further advantage of the present invention is to provide a loop in which no fuel is necessary and in which the fluid used to collect and transport energy is continuously recycled and fed back into said loop.

Still another advantage of the present invention is to provide an integrated approach to the designing and building of residences, office buildings, hotels, and other buildings in which the energy necessary to run the building.(for lighting, heating, air conditioning, electric appliances, etc . . . ) is produced within the structure of the building itself, therefore combining the cost of building materials with the cost of the energy supply. This would lower the total life-cycle cost of a building, compared to an older building retro-fitted with a solar power installation according to previous inventions.

The advantages of this invention are obtained by a system of several elements connected together to form a loop within a static structure, such as a wall of building or of a power generating structure, and by a method of operating the system. A moving fluid circulates within the loop. Part of the loop is comprised of a series of connected building blocks incorporated into the walls of a building. The building blocks also concentrate and collect solar radiation, to directly produce electricity by means of embedded photovoltaic cells, and to heat a moving fluid which cools, and carries the thermal energy away from, the solar cells and vertically up to a gas turbine connected to an electrical generator. The returning fluid, now condensed to a liquid, is directed downwardly to a liquid turbine connected to an electrical generator.

In a preferred embodiment of the invention, an electricity producing system is comprised of a fluid loop in a vertical plane located within a static structure and which includes a conventional gas or steam turbine coupled to an electric generator. The turbine is powered by the thermal energy carried by a moving fluid heated by solar energy collected by a building block that is part of the static structure and located at a lower level. A condenser and/or heat exchanger located at an upper level then returns the fluid to a liquid state. A substantially vertical pipe directs the flow of the liquid fluid vertically downward and back to a lower level. During the fall, the fluid is accelerated by the effect of gravity. A conventional hydraulic turbine coupled to an electric generator is powered by the kinetic energy of the fluid at the bottom of the vertical pipe. And a return pipe closes the loop by returning the fluid to the bottom of the series of building blocks.

DESCRIPTION OF THE PREFERRED EMBODIMENT

Figure 1:
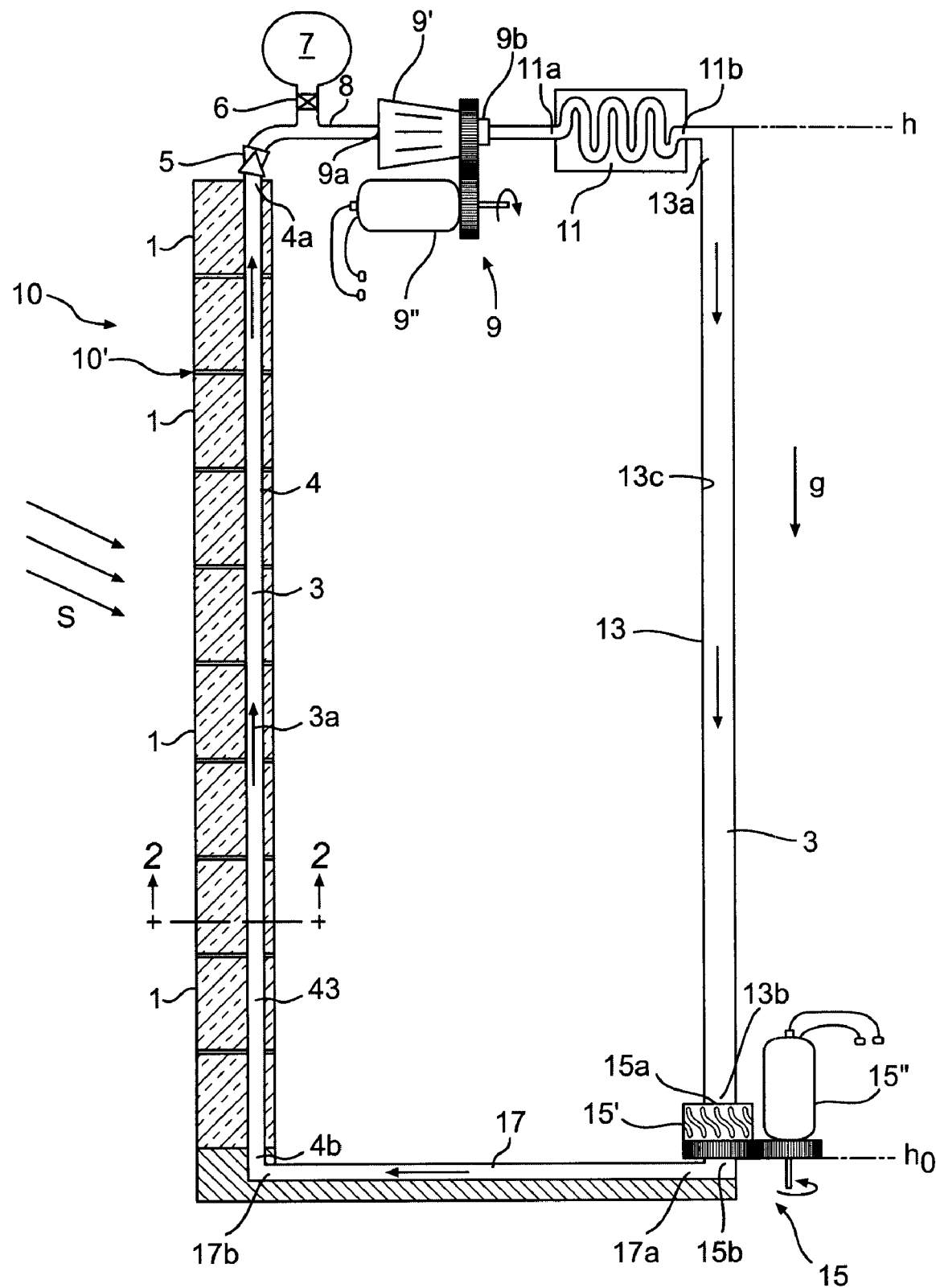
FIG. 1 is a schematic side elevational view, partially in cross section, of a building which incorporates the electricity generating elements forming a vertical loop.

With reference now to the figures wherein like elements have the same number throughout the several views, and in particular with reference to FIG. 1 there is depicted a schematic representation of a building 10 which incorporates the elements of an integrated electricity producing system.

Building 10 has an outer wall 10' comprised of a plurality of building blocks 1. Building blocks 1 are described in greater detail hereinbelow with reference to FIG. 2.

In the preferred embodiment of FIG. 1, a system for producing electricity, using an electromagnetic radiation S from the sun and a gravitational field g from the earth, comprises: building blocks 1 incorporated into walls 10' of building 10 or the like exposed to the electromagnetic radiation S; a geometrically situated loop comprised in part of blocks 1 and a plurality of electricity generating elements; and a moving fluid 3 circulating in the loop. In a preferred embodiment fluid 3 is water. The various electricity generating elements in the loop are powered by the different kinds of energy carried by fluid 3.

Each building block 1, when installed in wall 10', has a substantially vertically extending duct 43. A substantially vertical alignment of ducts 43 within adjacent blocks 1 (see also FIG. 2) forms a substantially vertical flow channel or primary pipe 4. Primary pipe 4 has an upper opening 4a and a lower opening 4b.

Upper opening 4a is connected to an input of a check or one-way valve 5, an output of which is connected to an input opening 9a of a heat turbine/primary electric generator assembly 9 with a fluid conduit or pipe 8. Assembly 9 is comprised of a conventional saturated steam driven turbine 9' and a conventional electrical generator 9" which is driven by turbine 9'.

An overflow reservoir 7 is connected through a pressure relief valve 6 to pipe 8 between the output of one-way valve 5 and input opening 9a of electric generator assembly 9.

An output opening 9b of heat turbine/primary electric generator assembly 9 is connected to an input 11a of a condenser 11.

An output 11b of condenser 11 is connected to a top opening 13a of a substantially vertical secondary pipe 13.

A bottom opening 13b of pipe 13 is connected to an input opening 15a of a hydraulic turbine/secondary electric generator assembly 15. Assembly 15 is comprised of a conventional falling water driven turbine 15' and a conventional electrical generator 15" which is driven by turbine 15'.

An output opening 15b of hydraulic turbine/secondary electric generator assembly 15 is connected to a input end 17a of a return pipe or line 17. To complete or close the loop, an output end 17b of return pipe 17 is connected to lower opening 4b of primary pipe 4.

Figure 2:
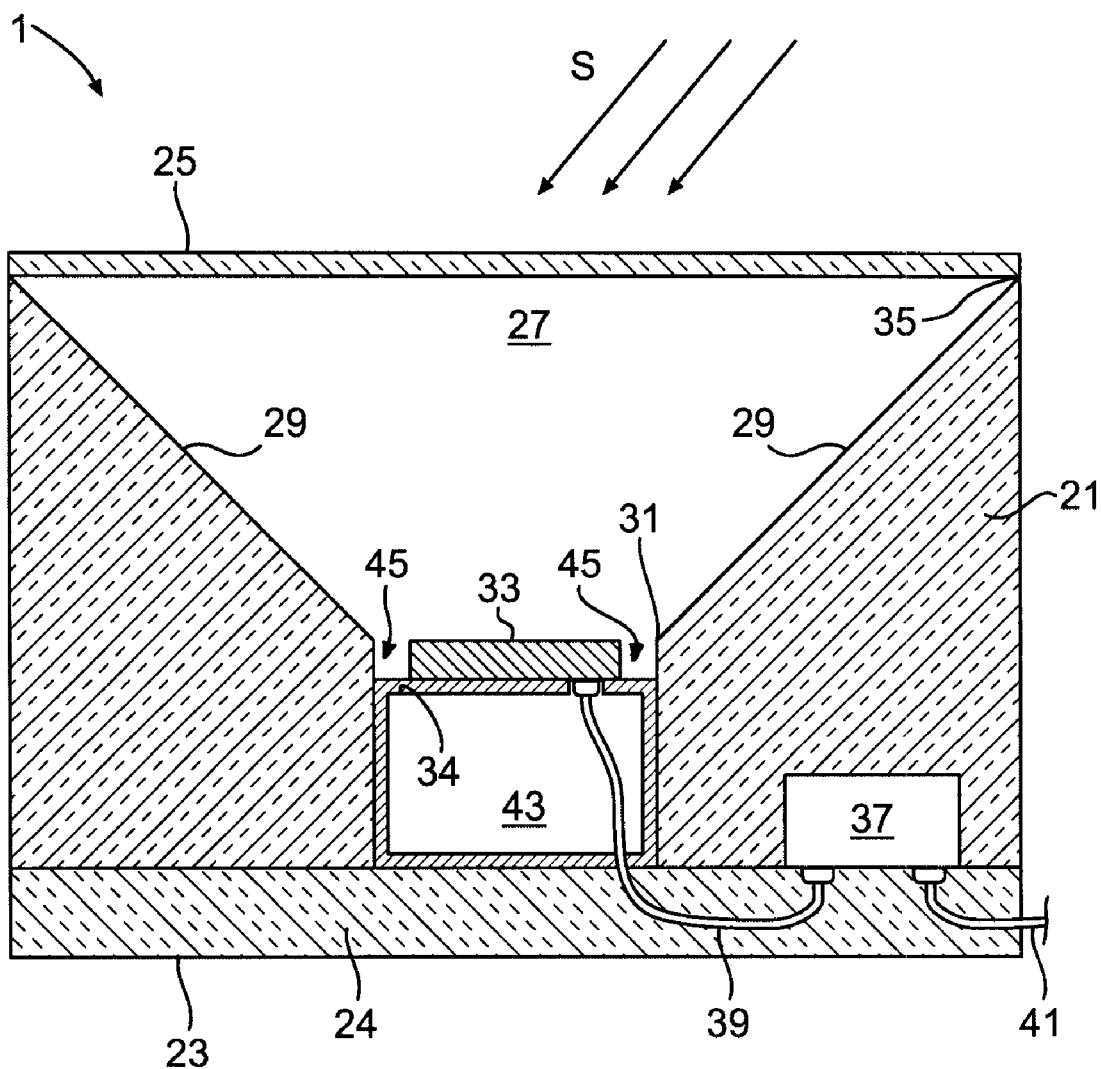
FIG. 2 is a cross-sectional view of a prior art building block taken along line 2—2 of FIG. 1.

As shown in FIG. 2, each building block 1 is used as a load bearing member of building 10 and has a body 21. Body 21 has an opposed inner side 23 and a cover or outer side 25.

In a preferred embodiment, a main portion of body 21 is preferably molded of a suitable material having compressive strength, such as glass. Cover 25 acts as a focusing lens and is preferably a Fresnel lens made of a clear material such as glass or plastic.

Inner side 23 is provided with a layer of insulation 24. Body 21 has a generally pyramidal recess 27 covered by outer side 25. In an alternate embodiment, recess 27 has can be conical. Recess 27 has side walls 29, an inner end 31 and an outer end opening 35 for exposure to electromagnetic radiation S. Each building block 1 further comprises a conventional photovoltaic cell 33 mounted on a portion of a front side 34 of duct 43 and thus disposed in body 21 within inner end 31 of recess 27.

Side walls 29 preferably have a reflective surface by means of which collimated sunlight passing through cover 25 is reflected and concentrated towards inner end 31 of recess 27.

External reflectors (not shown) can also be mounted, extending outwardly from outer edges of cover 25; the surface of the external reflectors making an appropriate angle with the surface of cover 25 so as to increase the collecting area for electromagnetic radiation and concentrate said electromagnetic radiation onto cover 25. The external reflectors can be made of a reflective material such as aluminum foil supported by a rigid structure extending around cover 25 of each building block 1.

A conventional electric battery 37 is disposed within body 21, and electric connectors 39 connect photovoltaic cell 33 to electric battery 37. Electric power generated by photovoltaic cell 33 upon the impingement of electromagnetic radiation S on photovoltaic cell 33 passing through outer end opening 35 can be stored in electric battery 37 or directly used to power an associated power utilization device (not shown). An electric circuit 41 connects electric battery 37 to the associated power utilization device so as to provide power thereto. Excess energy produced may be transmitted to commercial power companies by means of an inverter (not shown) and thereby stored in a network with further cost savings or profit resulting to an owner of the electricity producing system or building.

Duct 43 is substantially vertical in building block 1 when installed in wall 10'. Duct 43 is defined by an internally black coated hollow tube having a rectangular cross section comprised of a back wall which abuts a portion of layer 24 on a side of body 21 distant from cover 25, a front side 34 on which photovoltaic cell 33 is mounted, and by a first and second side walls. Duct 43 is adapted for the flow of moving fluid 3 therein and can have other appropriately shaped cross sections. Inner end 31 is provided with a spacing 45 around photovoltaic cell 33 for the passage of a heat radiation part of electromagnetic radiation S and impingement of heat radiation onto front side 34 of duct 43 for heating fluid 3 moving within duct 43. The portion of duct front side 34 facing cover 25 is preferably black for better absorption of the heat radiation.

Referring again to FIG. 1, primary pipe 4 provides a continuous flow of heated fluid 3 in a substantially vertical upward direction as shown by arrow 3a. When fluid 3 reaches the topmost building block 1, at upper opening 4a, it is a combination of water and saturated steam. A moisture separator (not shown) could be installed at this point to remove the water before fluid 3 reaches heat turbine 9'. The removed water could then be returned to primary pipe 3 with a conduit (not shown) or to some other location in the loop. One other location is at end 17b of return pipe 17, in which case it may be desirable to locate a one-way valve in return pipe 17 just upstream of the entrance of the conduit. One-way valve 5 prevents fluid 3 from falling back into primary pipe 4, and pressure relief valve 6 relieves any excess of pressure within heated fluid 3 that could damage the system.

At upper opening 4a of primary pipe 4, heated fluid 3 contains thermal energy and built-up pressure. The pressure and the thermal energy power the turbine of the primary electric generator assembly 9, and primary electric generator 9 produces electricity.

Fluid 3 coming out of output opening 9b of heat turbine/primary electric generator assembly 9 is still hot and/or in a gaseous phase. Condenser 11 condenses fluid 3 to a relatively cooled liquid state by removing thermal energy.

At this point, fluid 3 has given away a large portion of its thermal energy, but the physical location of fluid 3 in the loop is higher than its starting point at the lower opening 4b of primary pipe 4. Given the mass M and a relative height h of the location in the loop of fluid 3, nominally the height of secondary pipe top opening 13a, a given volume of fluid 3 will have a gravitational potential energy $E_G$. The gravitational potential energy $E_G$ can be calculated by the formula:

$$E_G = M \times g \times (h - h_0)$$

where g is the acceleration vector due to gravity at the surface of the earth; and $h_0$ is a base height, which is normally the location of turbine opening 15a. The gravitational potential energy $E_G$ can be retrieved by directing fluid 3 to enter into and fall down from relative height h back to relative height $h_0$, thus gaining kinetic energy.

The substantially vertical secondary pipe 13 provides a substantially vertical and downward path for fluid 3 and allows fluid 3 to be accelerated by the gravitational field of the earth. The actual kinetic energy gained by falling fluid 3 may be less than $E_G$ if friction forces between falling fluid 3 and an inner wall surface 13c of secondary pipe 13 are not negligible. Frictions between fluid 3 and the inner wall surface 13a of secondary pipe 13 can be minimized by using low-friction materials for secondary pipe 13, such as PVC or a teflon-coated material.

Hydraulic electric generator assembly 15 is used to convert the kinetic energy carried by falling fluid 3 into electric power.

At the bottom of the loop, return pipe 17 returns fluid 3 to an initial location at lower opening 4b of primary pipe 4 and thereby allows a continuous flow of fluid 3. Return pipe 17 can be installed with a downward inclination, output end 17b being lower than input end 17a, so as to allow fluid 3 to be accelerated by gravity and to enter primary pipe 4 with an initial speed. A pump (not shown), powered by electricity produced for example by photovoltaic cells 33, can also be used, when necessary, to give fluid 3 an initial speed at the bottom of primary pipe 4.

Thus, it can be seen that the vertical loop of the multistage system for energy production includes an integral part of the wall 10' of building 10 for a riser portion, a heat turbine 9' and condenser 11 and connecting piping located at a top loop portion of the loop, a down spout that is mounted in building 10 and is denoted secondary pipe 13, a hydraulic turbine 15' located at a bottom loop portion, and a return pipe 17 also mounted in building 10.

In operation, the sun's sunlight or electromagnetic radiation impinges wall 10' and the light portion thereof strikes the plurality of photovoltaic cells 33, thereby conventionally generating an electrical current that is delivered to storage batteries 37. In addition, because of the concentration of the sunlight by walls 29 of building block body 21 and by the focusing lens mounted on cover 25, the sunlight heats the air in cavity 27 and duct front side 34. This heat is transferred to water 3 circulating by natural convection and/or a pump (not shown) in pipe 43 in blocks 1. By being successively heated in the vertically stacked building blocks 1, the temperature of water 3 keeps increasing as it rises in ducts 43 until it boils and generates a saturated steam. The saturated steam drives heat turbine 9', which in turn drives electrical generator 9" and generates electrical energy. The still gaseous effluent from turbine 9' is then condensed into a liquid in condenser 11 and the liquid is directed into a down spout 13. At the bottom of down spout 13 is a hydraulic turbine which drives a second electrical generator 15". From there water 3 returns to entrance 4b of primary pipe 4.

Although the integral static structure has been described herein as being a building, in an alternative embodiment, it could simply be a wall erected, for example, on a side of a mountain with the down spout and return being mounted to supporting structure either connected to the wall or to the mountain side.

In an alternate embodiment of the present invention, the heat turbine/primary electric generator assembly 9 can be replaced with a thermionic or thermoelectric generator (not shown), that can convert thermal energy contained in the heated moving fluid 3 directly into electricity, without the use of a turbine. In yet another alternate embodiment of the invention, a Stirling engine (not shown) can be used instead of the heat turbine to power a dynamo-like electric generator (hot shown).

In still another alternate embodiment of the invention, condenser 11 can be coupled to a heat exchanger (not shown) in which a secondary fluid (not shown) retrieves some thermal energy still carried by the heated moving fluid 3. The secondary fluid could be water and could be used to drive a further thermoelectric or thermionic generator, for domestic heating, or as a hot water supply for domestic use.

In alternate embodiments, any appropriate fluid, other than water, can be used to maximize the efficiency of the system. The efficiency depends on the height on the structure, the nature of the heat-to-electricity conversion means that is used, the local climate, and other possibly intervening factors. Some examples of other fluids can include alcohols, chlorinated organic compounds or mixtures of water and glycol. Preferably, the fluid will have a liquid state at around room temperatures and pressure, and a gaseous state at temperatures which are reached inside duct 43 of building block 1.

Although only a few exemplary embodiments of the present invention have been described above, it will be appreciated by those skilled in the art that many changes may be made to these embodiments without departing from the principles and the spirit of the invention, the scope of which is defined in the appended claims.

I claim:

1. An integrated system for producing electricity in a static structure using electromagnetic radiation and the earth's gravitational field, wherein the system comprises the following elements, in combination,
   a vertically extending wall in the static structure having an outer side that can be irradiated with the electromagnetic radiation and an inner side, said wall comprised of a plurality of vertically aligned building blocks, each building block comprised of
      a body having an outer side which is part of said wall outer side and which is transparent to the electromagnetic radiation and having an internal cavity therein which can receive the electromagnetic radiation,
      a photovoltaic cell mounted in said body cavity so as to be exposed to the electromagnetic radiation and which produces electric power upon the impingement thereof of the electromagnetic radiation,
      a substantially vertically extending duct in said body, said duct having a wall on which the electromagnetic radiation can impinge, said photovoltaic cell being mounted in contact with said duct wall, and said duct of one of said building block being in alignment with said ducts of building blocks thereabove and therebelow so as to provide a substantially vertical primary pipe or conduit for a fluid that can be contained in said conduit and that can be heated by the electromagnetic radiation, said primary pipe having a lower end portion and an upper end portion, and the fluid having a liquid state and a gaseous state such that said fluid can be transformed from the liquid state to the gaseous state upon being heated in said primary pipe;
   a primary electricity generating assembly comprised of a heat turbine and a primary electric generator driven by said heat turbine, said heat turbine being in fluid communication with said primary pipe upper end portion such that said heat turbine can be driven by a heated fluid in said primary pipe, said primary electricity generating assembly being mounted at an upper location in said static structure;
   a substantially vertical secondary pipe having an upper end portion and a lower end portion and mounted in the static structure in fluid communication with said heat turbine at said upper end portion, said secondary pipe providing a conduit through which fluid coming from said heat turbine can fall vertically downwardly;
   a secondary electricity generating assembly comprised of a hydraulic turbine and a secondary electric generator driven by said hydraulic turbine, said hydraulic turbine being in fluid communication with said secondary pipe lower end portion such that said hydraulic turbine can be driven by a falling fluid in said secondary pipe, said secondary electricity generating assembly being mounted at a lower location in said static structure; and
   a return pipe in fluid communication between the hydraulic turbine and said primary pipe lower end portion.

2. The system as claimed in claim 1, further comprising a condenser for returning the heated fluid to a liquid state by removing thermal energy therefrom, said condenser having a warmer input opening and a cooler output opening, said warmer input opening being in fluid communication with a hot-fluid output opening of said heat turbine.

3. The system as claimed in claim 1, further comprising a heat exchanger thermally coupled to a hot-fluid output opening of said heat turbine such that said heat exchanger can retrieve thermal energy from the fluid.

4. The system as claimed in claim 1, wherein said fluid is water.

5. The system as claimed in claim 1, wherein the static structure is an enclosed building and said wall is an outer wall of said static structure.

6. The system as claimed in claim 1 and further including an electrical storage battery in electrical connection with said photovoltaic cell, said battery storing the electricity generated by said photovoltaic cell.

7. The system as claimed in claim 6 wherein said battery is disposed within said building block body.

8. The system as claimed in claim 1 wherein said duct wall transmits electromagnetic heat radiation.

9. The system as claimed in claim 1 wherein said building block cavity focuses the electromagnetic heat radiation on said photovoltaic cell.

10. A method for generating electric power using electromagnetic radiation and the earth's gravitational field, using a static structure comprising the following elements, in combination,
    a moving fluid;
    a plurality of building blocks for structures such as walls or the like exposed to the electromagnetic radiation, each having a body for use as a building unit having opposed inner and outer side faces, said body outer side face having a recess therein, said recess having side walls and an inner end, said plurality of building blocks each further comprising
       a photovoltaic cell disposed in said body within the inner end of said recess, said recess having an outer end opening into said body outer side face for exposure to the electromagnetic radiation in a wall construction,
       an electric battery disposed within said body,
       electric connectors for connecting said photovoltaic cell to said electric battery whereby the electric power generated by said photovoltaic cell upon the impingement of the electromagnetic radiation on said photovoltaic cell passing through the outer end opening of said recess is stored in said electric battery,
       an electric circuit for connecting said electric battery to an associated power utilization device,
       a substantially vertically extending duct in said body adjacent said inner side face on the opposite side of said photovoltaic cell from said body outer side face, said duct being adapted for the flow of said moving fluid therein and wherein said recess inner end is provided with an opening for the passage of the electromagnetic radiation into said duct for heating said fluid moving within said duct;

a substantially vertical primary pipe having an upper opening and a lower opening, comprising linearly connected ducts within adjacent ones of said plurality of building blocks, and providing a continuous flow of the heated moving fluid in a substantially vertical upward direction;

a heat-turbine/primary electric generator assembly, having a hot-fluid input opening and a hot-fluid output opening, said hot-fluid input opening being in fluid communication with the upper opening of said primary pipe, and said primary electric generator producing electricity;

a condenser for returning the heated moving fluid to a cold liquid state by removing a thermal energy carried by said moving fluid, said condenser having a warm input opening and a cold output opening, said warm input opening being in fluid communication with the hot-fluid output opening of said heat turbine/primary electric generator assembly;

a substantially vertical secondary pipe, having a top opening and a bottom opening, said top opening being in fluid communication with the cold output opening of said condenser, and said secondary pipe providing a substantially vertical and downward path for the moving fluid and allowing the moving fluid to be accelerated by the gravitational field of the earth;

a hydraulic turbine/secondary electric generator assembly, having a liquid input opening and a liquid output opening, said liquid input opening being in fluid communication with the bottom opening of the secondary pipe, and said secondary electric generator producing electricity;

a return pipe having and input end and an output end, said input end being in fluid communication with the liquid output opening of the hydraulic turbine/secondary electric generator assembly, and said output end being in fluid communication with the lower opening of the primary pipe for returning the moving fluid to an initial position at the lower opening of said primary pipe and allow a continuous flow of said moving fluid.

* * * * *